United States Patent [19]
Peterson

[11] Patent Number: 4,973,194
[45] Date of Patent: Nov. 27, 1990

[54] METHOD FOR BURIAL AND ISOLATION OF WASTE SLUDGE

[75] Inventor: Melvin N. A. Peterson, Del Mar, Calif.

[73] Assignee: The United States of America as represented by the Secretary of Commerce, Washington, D.C.

[21] Appl. No.: 229,935

[22] Filed: Aug. 8, 1988

[51] Int. Cl.$^5$ ............................................. B09B 3/00
[52] U.S. Cl. ..................................... 405/128; 405/52; 405/53
[58] Field of Search .................. 405/128, 129, 52, 53, 405/228

[56] References Cited

U.S. PATENT DOCUMENTS

| | | | |
|---|---|---|---|
| 3,108,439 | 10/1963 | Reynolds et al. | 405/128 X |
| 3,513,100 | 5/1970 | Stogner | 405/128 X |
| 3,526,279 | 9/1970 | Colburn | 405/128 X |
| 3,835,652 | 9/1974 | Hignite | 405/129 |
| 3,980,558 | 9/1976 | Thompson | 405/128 X |
| 4,178,109 | 12/1979 | Krutenat | 405/128 |
| 4,316,814 | 2/1982 | Uerpmann | 405/128 X |

FOREIGN PATENT DOCUMENTS

| | | | |
|---|---|---|---|
| 2742340 | 3/1979 | Fed. Rep. of Germany | 405/128 |
| 0023872 | 2/1977 | Japan | 405/128 |

Primary Examiner—Dennis L. Taylor
Attorney, Agent, or Firm—Thomas Zack; Alvin J. Englert; Marvin S. Towsend

[57] ABSTRACT

A method of disposal of waste solid material in an underwater geologic formation on the continental margins comprises the steps of: drilling a large diameter hole into the geologic formation to a depth of several hundred feet in a single stroke operation; depositing a slug of a paste of waste material into the bottom of the hole thereby burying the slug; and permitting the geologic formation adjacent to the hole above the buried slug to fill the hole above the slug, thereby sealing the buried slug in the geologic formation. A continuous slug of waste material can be used, or the waste material can be formed into discrete charges of material.

34 Claims, 8 Drawing Sheets

METHOD FOR BURIAL AND ISOLATION OF WASTE SLUDGE

BACKGROUND OF THE INVENTION

1. Field of the Invention

The present invention relates to disposal of sludge and in particular relates to disposal of sludge in geologic formations.

2. Background Art

Each year almost 2 million dry tons of sewage sludge are created in the coastal and estuarine region of the United States. Almost three times this amount is created each year in the nation, and the amount is increasing. In addition to containing abundant nutrients, sewage sludge commonly also contains a considerable amount of various toxic components that are concentrated in this final residue of sewage treatment.

Presently, the main choices for disposal of the sewage sludge are by dumping either on land or at sea. Dumping on land runs the risk of allowing toxic components to find their way into fresh water resources. In near coastal areas, both toxic components and nutrients may leach and flow into and through the estuarine zone, contributing their deleterious effects in this area.

Dumping at sea runs a multiple risk: toxic components can be concentrated through the food chain, to affect the health of marine life and the quality and safety of seafood. Excess nutrients and oxidizable material can deplete the oxygen content of seawater where oceanographic conditions permit. Human disease pathogens, when present in the sludge, can directly contaminate seafood. Persistent excess nutrients may possibly contribute to blooms of toxin producing marine microorganisms, and these toxins will be concentrated in dangerous amounts in seafood such as shell fish.

There is nothing particularly evil about human excrement or sewage based solely thereupon. It is excellent and nutritious for the right organisms and makes fine fertilizer, provided human diseases are not recycled with it. The problem of disposal of materials found in sewage systems resides in the other materials that are introduced into sewage systems. For example, industrial waste and toxic chemicals often are disposed of in sewage systems. These materials create the intransigent problems associated with safe sewage disposal. Thus, it would be desirable to have a method of sewage disposal that provides substantial environmental isolation of the disposed of sewage.

Aside from direct dumping, incineration of sewage sludge has been contemplated. Incineration of sewage sludge, however, leaves a residue in which toxic materials, especially metals, are even further concentrated. Dumping of such residues is especially environmentally undesirable.

The patent literature discloses methods for disposing of sludge underground. More specifically, U.S. Pat. No. 3,335,798 of Querio et al discloses a process for disposal of biologically activated waste sludge in a well drilled in a land formation. The land formations are disclosed as being "porous and permeable and readily accept the waste solids-containing slurry". The sludge is in the form of an aqueous slurry of 1 to 5 percent undissolved sewage solids. The hole is at a depth of 3916 feet, and the bore of the well is 8½ inches. In evaluating the Querio et al patent, one should consider the desirability of having waste materials substantially permeate a geologic formation in which they are deposited. One should also consider the availability of such holes and geological conditions in areas of high population and need. Such a practice might be highly questionable because of the risks of environmental contamination by unknown migration or unwanted exit. Rather, it would be desirable to provide a method for disposing of sludge in a low-permeability formation to provide environmental isolation and in a controlled manner.

Furthermore, the example of drilling an 8½ inch hole to a depth of 3916 feet requires large amounts of time (perhaps days or weeks), energy, and expense and provides a disposal site for only a relatively small amount of sewage solids. For such a hole, assuming an approximately 200 feet sealing space on top of the disposed of waste, the remaining 3716 feet deep hole would be capable of holding only approximately 0.6 ton of sewage solids, counting only the volume of such a hole, itself and not the uncontrolled volume into which the slurry would be injected. It would be desirable, therefore, to provide a sewage sludge burial method that is capable of handling large amounts of sludge in a relatively short period of time, with relatively low energy expenditure, and without uncontrolled and unknown invasion and injection.

U.S. Pat. No. 3,724,542 of Hamilton discloses a method of disposal of waste activated sludge which involves using deep wells which penetrate hydrocarbon formations. The sludge is introduced into the formation through the well bore. Methane is produced by the organisms in the sludge as they interact with the hydrocarbons in the formation. It would be desirable, however, to dispose of sludge in a relatively shallow hole in a formation that does not contain significant hydrocarbons, and also by a method that does not require uncontrolled and relatively unknown invasion of the formation by injection and fracturing.

Besides sewage sludge, certain soils from former industrial or disposal sites may contain toxic components, the cleanup of which is made difficult without a safe method of disposal. Also, dredged material from some harbors, bays, lakes, estuaries, or channels may have sufficient contamination to make it environmentally unwise to simply shift the material to some other unprotected and poorly isolated location.

SUMMARY OF THE INVENTION

Accordingly, an object of the invention is to provide a method for disposal of sludge that provides substantial environmental isolation of the disposed of sludge.

Another object of the invention is to provide a method for disposing of sludge in a geologic formation of relatively low permeability to provide environmental isolation.

Still another object of the invention is to provide a sludge disposal method that is capable of handling large amounts of sludge in a short period of time, in a manner that does not introduce uncontrolled invasion into an unknown volume of geologic formation.

Yet another object of the invention is to provide a method to dispose of sludge in a relatively shallow hole in a geologic formation that does not contain hydrocarbons that are valuable for fuel, or with the purpose of producing fuel.

In accordance with the principles of the invention, waste sewage sludge, waste soils, biological wastes, industrial wastes, macerated garbage, mine tailings, incineration ash, dredged material, and other waste materials are disposed of and isolated by: forming a relatively large diameter hole in a geologic formation; depositing a slug of waste material into the bottom of the hole, the slug being a quantity of an extrudable paste of the waste solid material and water and having a density greater than the geologic formation adjacent to the hole; and permitting the geologic formation adjacent to the hole to fill the hole on top of the deposited slug, thereby burying and sealing the waste material in the hole in the geologic formation.

The extrudable paste is of relatively thick consistency, generally a putty-like material in which viscous effects dominate, but capable of being extruded by deformation into the volume excavated for the purpose. The paste can be extruded into the hole by hydraulic pressure or a piston or ram. Another important characteristic of the paste is that it have a density greater than the density of the geologic formation in which it is deposited so that it will not float to the top of the formation once it is has been deposited within and sealed over by the formation.

Reference is made to "Administratively Restricted" planning document: "A Proposal for an Alternative Sewage Sludge Disposal Method" dated July 18, 1988, by the Office of the Chief Scientist, U.S. Department of Commerce, National Oceanic and Atmospheric Administration.

The preferred burial sites are the thick and rapidly accumulating sediments of the continental margins. In the geologically stable east coast and gulf coast, in a site that is not subject to geological slumping, the extent of the time of containment and isolation would be many millions of years, indeed, tens of millions of years. The burial of the waste sludge is at several hundreds of feet under the continental margins. The burial hole is covered by sediment of the formation which effectively inhibits diffusion of or from the sludge. The depth of the water over the burial site is determined only by limitations imposed by the hole forming equipment and components for transferring the sludge into the seafloor area.

Preferably, the selected sites for burial of the waste sludge are geologically unfavorable for oil and gas deposits . at greater depth or for subsea fresh water aquifers, which are rare.

The hole can be formed in the geologic formation by a variety of techniques. A drill bit can be used to form a hole, and pressurized seawater can be used to wash out the formation to provide a clear hole for receipt of waste sludge. Another technique of hole formation may simply be the injection of seawater under sufficient pressure to wash out a hole without using a drill bit. Alternatively, a rotating or non-rotating drill pipe penetrating the formation mainly by the pull of gravity, with an attached reaming device and supported by a derrick, or other device, can also be used to form a hole in the geologic formation.

The concept of the non-invasive paste that is inserted into a volume in a geologic formation excavated for the purpose of receiving it, and adjusted in density so it will not rise buoyantly in the formation, and capped by a sediment or seal of low permeability, are the central ideas in the method of the invention.

BRIEF DESCRIPTION OF THE DRAWINGS

FIGS. 7A-12D are schematic diagrams of configurations of penetrating pipes used with the disposal method;

DETAILED DESCRIPTION OF PREFERRED EMBODIMENTS

Figure 1:
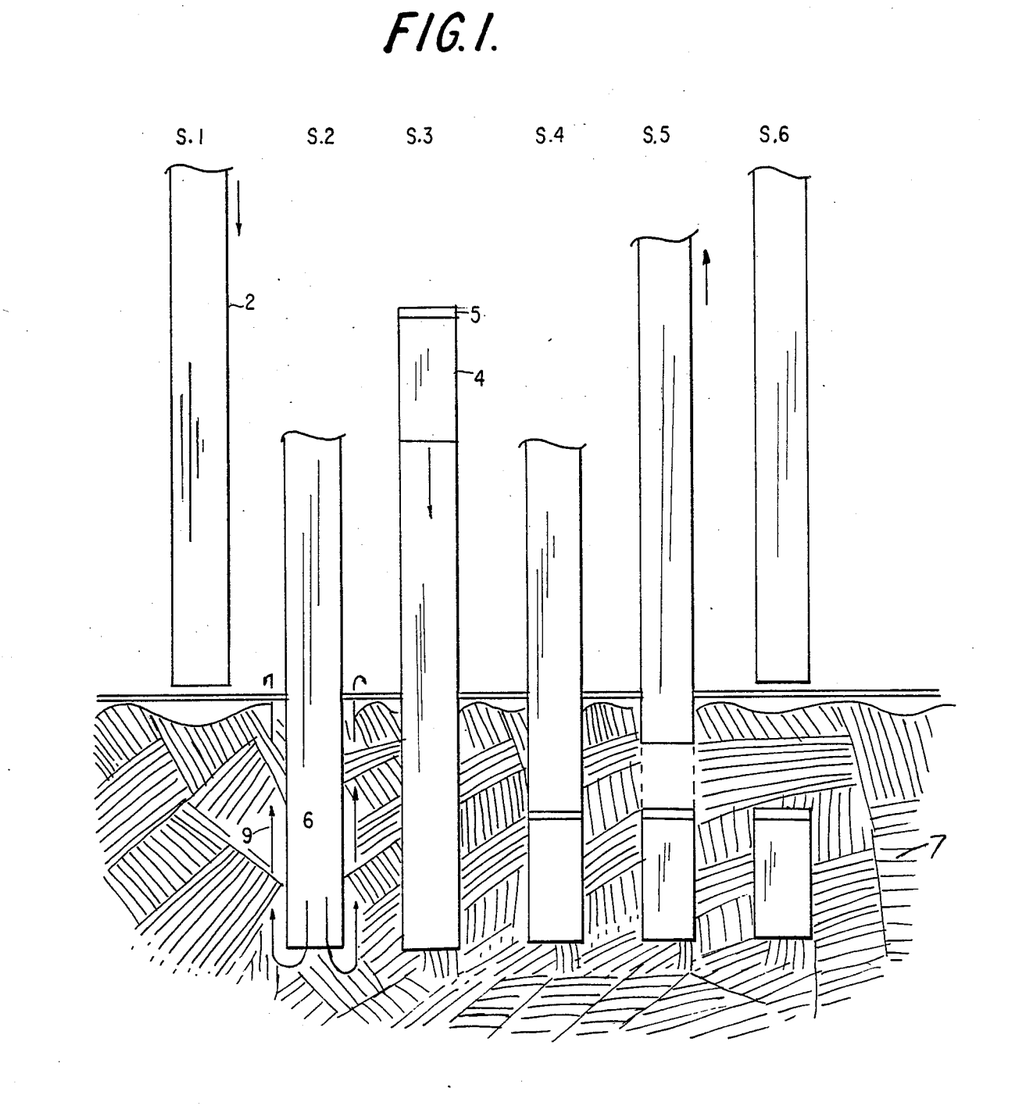
FIG. 1 is a schematic representation of the steps of one embodiment of the disposal method shown in connection with a cross-section of a continental margin.

Referring to FIG. 1, a sequence of operations in accordance with one embodiment of the disposal method of the invention is depicted. In sequence step 1, the drilling equipment, not shown except for a drill pipe 2 which forms the wall for a drilled hole 6 in the sea floor 7, is set up. In . step 2, the hole 6 is drilled and the hole 6 is washed out with pumped seawater, represented by arrows 9. A drill bit may be employed to cut the hole 6 wall to a diameter that is larger than the diameter of the drill pipe which is used, thereby providing an annular space between the hole 6 wall and the outer surface of the drill pipe.

As the hole 6 is being drilled, the drill pipe 2 is lowered into the sediment. Pumped seawater is used to flush the drilled sediment out of the hole 6. The seawater passes down the drill pipe 2 and flushes the sediment up the annular space between the hole 6 wall and the outer surface of the drill pipe. Although not shown in the drawing, the flushed out sediment would normally form a plume of sediment at the top of the hole 6.

The pumps used to pump the seawater can be standard pumps such as used on a conventional off-shore drilling ship. Such pumps are commonly known as mud pumps and are commonly used to circulate drilling mud.

After drilling and washing the hole 6 in the sediment to the desired depth, most commonly from two to six hundred feet deep, the third step in the sequence takes place. In step 3, a slug 4 of paste is introduced into the top of the drill pipe. The slug 4 can be shaped to fit into the drill pipe 2 at the disposal site such as at the top of the drill pipe, or the slug 4 can be preshaped at another location and brought to the disposal site in a special slug 4 holder.

A plug or boot 5, which seals against the inside of the pipe, may be placed over the slug 4 to allow the slug 4 to be pushed down the pipe by the seawater without permitting the slug 4 to be disintegrated by the pumped seawater.

The extent of clearance between the shaped slug 4 and the inside of the drill pipe 2 is determined by frictional requirements. That is, if there is a large coefficient of friction between the slug 4 material and the inside of the drill pipe, then the clearance would be relatively large to prevent an undesirable amount of friction and a resulting slow or difficult descent of the slug 4 down to the bottom of the hole 6. On the other hand, if the coefficient of friction between the slug 4 material and the inside of the drill pipe 2 is relatively small, then a small clearance would be appropriate so that a sufficient amount of friction would prevent a descent down the hole 6 that is too rapid.

In the 4th step of the sequence in FIG. 1, while the drill pipe 2 is still near the bottom of the hole 6, the slug 4 may be forced to the bottom of the pipe by additional pumping of seawater.

In the 5th step of the sequence, a volumetrically correct amount of additional seawater is pumped into the pipe while, simultaneously, the drill pipe 2 is raised out of the hole 6. In this way, the location of the slug 4 at the bottom of the . hole 6 is maintained, and any tendency of the slug 4 to follow the withdrawing pipe up the hole 6 is precluded. In this step, the slug 4 is effectively extruded from the drill pipe 2 at the bottom of the hole 6. The plug or boot and the seawater behind it serve as a ram for extruding the slug 4 out of the pipe into the hole 6 bottom.

In the 6th step of the sequence, the pipe is completely withdrawn from the sediment, and the sediment surrounding the hole 6 above the level of the slug 4 is permitted to collapse or slump into the hole 6 over the buried slug 4. The mere removal of the inherent support provided by the drill pipe 2 when the drill pipe 2 is removed from the sediment may bring about sediment collapse into the hole 6. Under the influence of gravity, a soft mud will simply slump into the unsupported hole 6 in a time frame from several hours to several days depending upon the particular characteristics of the particular geologic formation.

As an adjunct to permitting the sediment surrounding the hole 6 above the deposited slug 4 to simply collapse into the hole 6 over the buried slug 4 under the influence of gravity and thereby seal the slug 4 in its buried location, various techniques can be used to induce the sediment to collapse over the slug 4. One factor that may induce the geologic formation above the deposited slug 4 to collapse over the buried slug 4 is the presence of an inherent suction that is created when a. drill pipe 2 is withdrawn quickly from a hole 6. The suction created may tend to suck the surrounding formation into the unsupported hole 6.

Other methods for collapsing the sediment into the hole 6 above the buried slug 4 include poking of adjacent holes 6, either for the separate purpose of inducing collapse or for adjacent burial. Adjacent holes 6 would further weaken the support for the original hole 6 and, thereby, would aid in the collapse of the walls of the original hole 6 over the buried slug 4. Alternatively, a retractable arm could be installed in the drill pipe 2 that could jut out from the pipe when the pipe is retracted so that it would score the wall of the hole 6 thereby inducing it to collapse. Additionally, the upper portion of a slug could be of material intentionally suitable for being a safe barrier, or sufficient to await natural closing above.

After sealing of the buried slug 4 in the hole 6, the drilling equipment is moved to the next site for hole 6 drilling and slug 4 burial.

For the method of the invention depicted in FIG. 1 and described above, the use of off the shelf equipment is preferred, except for the drill pipe 2 which has a diameter (two to six feet) which is larger than the diameter of conventional drill pipes. The method of FIG. 1 is particularly useful for small scale operations and pilot studies. By using the steps of the method depicted in FIG. 1, sediment would be dispersed at the sea floor in an amount equivalent to the drilled hole 6.

Figure 2:
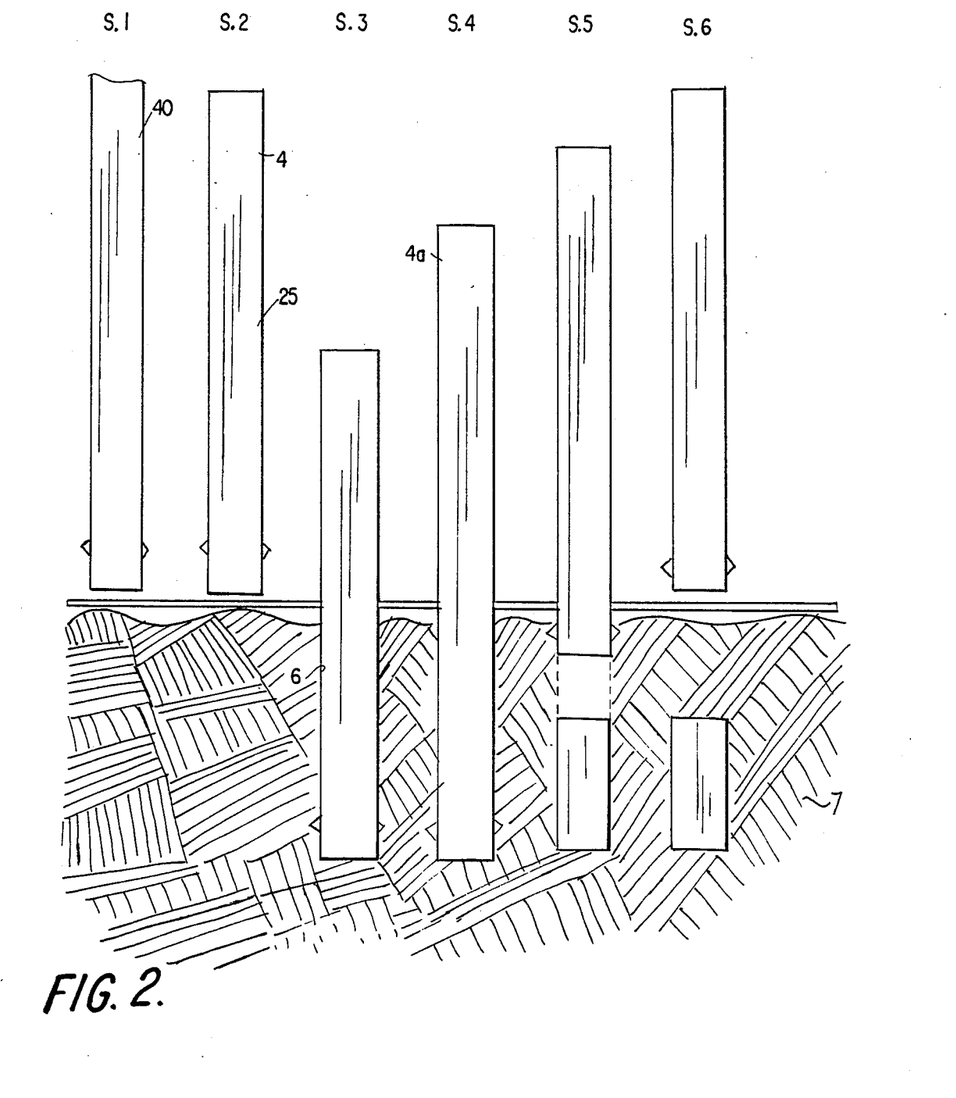
FIG. 2 is a schematic representation of the steps of a second embodiment of the disposal method shown in connection with a cross-section of a continental margin.

Another embodiment of the sludge disposal method of the invention is depicted in FIG. 2. in which a drill pipe 40 (see FIG. 17) is charged with a continuous slug 4 of waste material portions of which are sequentially disposed of in a sequence of drilled or evacuated holes 6. In the method depicted in FIG. 2, both gravitational penetration and reaming by plastic deformation of the geologic formation are conducted simultaneously. In essence the geologic formation is punctured by the drill pipe 40, and the sediments in the formation are essentially squeezed aside by the penetrating drill pipe 40. Using this embodiment of the invention, the sediments are not washed out of the hole 6, and, consequently, an environmentally undesirable plume of sediment is not formed at the top of the hole 6.

More specifically, in the 1st step in the sequence of steps shown in FIG. 2, the drilling equipment, not shown except for the drill pipe 40 which forms the wall for a drilled hole 6, is set up.

In the 2nd step of the sequence shown in FIG. 2, the pipe 40 is initially loaded with a slug 4 of paste of waste material.

In the 3rd step of the steps of FIG. 2, the loaded pipe . 40 is penetrated into sediment to form a hole 6 without displacing the slug 4 from the pipe 40. As explained below, a one-way valve 42 (see FIG. 17) prevents the slug 4 from being displaced from the penetrating pipe 40 during penetration, and also prevents, if needed, entry of the sediment into the orifice. The penetration of the pipe 40 into the sediment is halted when the desired depth of the bottom of the hole 6 is obtained.

In the 4th step of the sequence of steps shown in FIG. 2, a replacement slug 4 of paste is inserted at the top of the pipe 40 directly on top of the initially placed slug 4.

In the 5th step shown in FIG. 2, the initially placed slug 4 is continuously extruded out the bottom of the pipe 40 into the hole 6. In addition, simultaneously, the pipe 40 is proportionately withdrawn from the bottom of the hole 6, thereby depositing the original slug 4 in the hole 6. Furthermore, simultaneously, the replacement slug 4 is moved farther into the pipe 40 as the pipe 40 is withdrawn from the hole 6 and as the pipe 40 recedes from the original slug 4 which remains in the hole 6. A conventional draw works employing pulleys and cables may be used to withdraw the pipe 40 from the hole 6. Alternatively, a gear arrangement may be used to engage complementary teeth on the drill pipe 40 to withdraw the pipe 40 from the hole 6.

In the 6th step in FIG. 2, the cycle is complete. The equipment, including the pipe 40 and a replacement slug 4 already loaded in the pipe 40 above the sediment surface, has been removed completely from the hole 6 and is ready for operation at the next hole site. As the pipe 40 is removed completely from the hole 6, the sediment adjacent to the hole 6 above the buried slug 4 is no longer held back from collapsing into the hole 6 by the pipe 40. Without the pipe 40 being present, the sediment is permitted to fill the hole 6 above the slug 4, thereby sealing the buried slug 4 in the hole 6.

In the 3rd step of FIG. 2, penetration of the drill pipe 40 into the sediment may be obtained by straight gravity pull or by rotating the drill pipe 40 and reaming out the hole 6. The drill pipe 40 rotation could be continuous or reversing if desired. The penetrating force for vertical holes 6 is essentially gravitational. In this mode, a reaming bit could face outward from the drill pipe 40 and could incorporate a one-way valve 42, such as a spring-biased clam shell or flap valve shown in FIG. 17.

Figure 17:
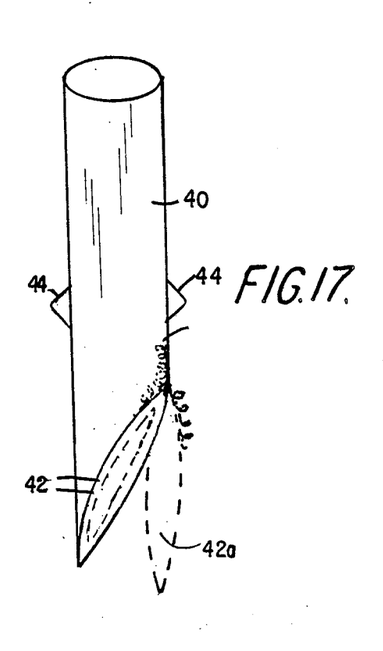
FIG. 17 is a schematic drawing of a penetrating pipe, as in FIGS. 7-12, showing a constraining mechanism for preventing the content of the geologic formation from entering the pipe, in principle, at the bottom of the pipe.

The one-way valve 42 remains closed while the loaded pipe 40 is being pushed into the formation. Closure of the one-way valve 42 is maintained as the one-way valve 42 receives outside forces exerted by the formation being penetrated that are greater than forces exerted from inside the drill pipe 40.

However, the one-way valve 42 opens when the slug 4 of waste inside the pipe 40 is extruded out from the pipe 40 into the formation. When pressure is exerted on the slug 4 to extrude it from the drill pipe 40, the forces from inside the pipe 40 on the one-way valve 42 are greater than the force exerted by the penetrated formation in the opposite direction on the one-way valve 42. Thus, the one-way valve 42 will open and permit the slug 4 to be extruded from the drill pipe 40 into the formation.

The one-way valve 42 should remain shut under another set of circumstances. Once the internal pressure to extrude the paste into the hole 6 has ceased, the one-way valve 42 should shut and remain shut even though the contents of the drill pipe 40 exerts some pressure on the one-way valve 42 from inside due to the inherent weight of the contents under gravitational pull. To reduce the effects of the weight of the contents of the drill pipe 40 on the one-way valve 42, the interior surface of the drill pipe 40 can be provided with means for increasing friction against the contents of the interior of the pipe 40 and thereby to inhibit flow of the contents. Increases in frictional forces will lessen the pressure of the pipe 40 contents that is exerted from inside the pipe 40 on the one-way valve 42 thereby balancing the gravitational forces exerted by the contents on the inside of the one-way valve 42. More specifically, the interior of the drill pipe 40 can be provided with an artificially roughened surface or vanes sticking out into the paste slug 4 or a constriction in the pipe 40 that the slug 4 would have to squeeze by to overcome frictional resistance to flow. One or more such constrictions could be made adjustable as a hydraulically inflatable doughnut that closes its hole when inflated as shown in FIGS. 17C and 17D.

The reamed hole 6 could be somewhat larger than the continuous length of drill pipe 40, to reduce pullout forces, and the bit could ream upon pullout.

Various combinations of outer cross-section of the penetrating pipe 40 can be employed as shown in FIGS. 7-12 which include circular or regular polygonal (in FIG. 7), oval or compressed polygonal (in FIG. 8), tapered oval with larger diameter at top and small diameter at bottom (in FIG. 9), twisted oval (FIG. 10), oval, tapered, and twisted with constant pitch (in FIG. 11), and oval, tapered, and twisted with variable pitch (in FIG. 12).

A somewhat oval cross-section, thinning downward, and twisted with varying (increasing or decreasing) pitch downward may be particularly desirable in that it would allow penetration of the pipe 40 intentionally crossing its own thread to convert torsion to forcing the hole 6 more open.

The replacement slug 4a supplied in the 4th step of FIG. 2 is supplied to the continuous column of paste to be volumetrically extruded from the penetration pipe 40 in the equivalent desired amounts.

Figure 3:
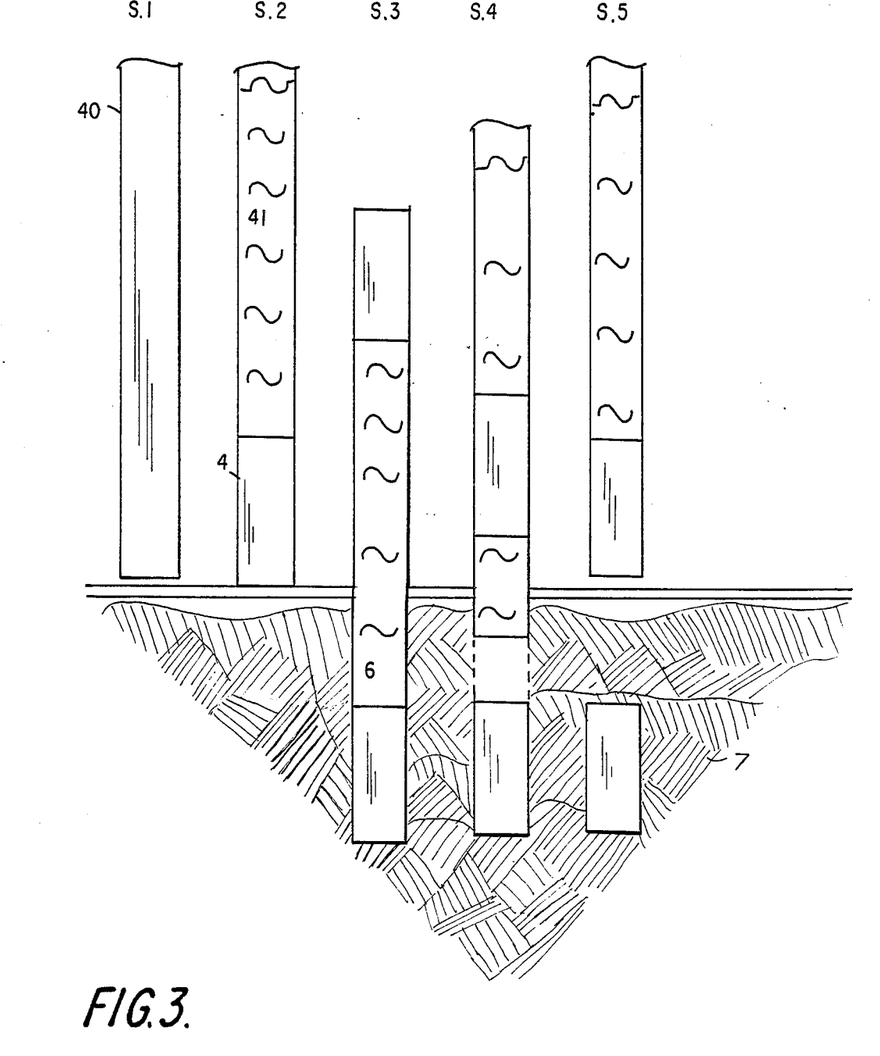
FIG. 3 is a schematic representation of the steps of a third embodiment of the disposal method shown in connection with a cross-section of a continental margin.

As depicted in FIG. 3, alternatively, a plurality of discrete replacement slugs 4 of paste can be separated from one another by a section of seawater. In the 1st step of FIG. 3, the equipment is initially set up. In the 2nd step of FIG. 3, a charge of slug 4 paste is loaded into the penetration pipe 40, and a charge of seawater 41 is placed on top of the slug 4. In the 3rd step in FIG. 3, the penetration pipe 40 is penetrated into the sediment. In the 4th step, the slug 4 is extruded out of the pipe 40, and simultaneously, the pipe 40 is raised to the surface leaving the slug 4 buried in the hole 6 and discharging the seawater on top of the slug 4 out of the pipe 40. In the 5th step, the penetration pipe 40 has been removed completely from beneath the sediment, the seawater on top of the slug 4 has been completely discharged from the pipe 40, the next slug 4 charge has been moved to the end of the pipe 40, and the sediment over the buried slug 4 has filled the hole 6 over the buried sludge thereby sealing the buried sludge in the sediment.

The layers of seawater interposed between discrete slugs of waste paste serve a useful function in permitting the one-way valve 42 (see FIG. 17) located at the bottom of the penetration pipe 40 to reclose once a slug 4 of paste has been extruded therethrough. The closing force for the one-way valve 42 can easily overcome the relatively insignificant viscosity of seawater and thereby readily close once material is no longer being extruded from the drill pipe 40 past the one-way valve 42. If seawater were not present, however, a thick residue of slug 4 paste and the mud in the hole 6 may pose a resistance that is too great to be overcome by the one-way valve 42, and therefore, the one-way valve 42 might not readily close after the slug 4 had been extruded from the drill pipe 40.

The inherent closing force of the one-way valve 42 must be selected to prevent the material in the drill pipe 40 from opening the one-way valve 42 simply under the influence of gravity. The one-way valve 42 should be opened only under the influence of extruding pressure.

Once extruding pressure ceases, the one-way valve 42 should close automatically or be closed.

When a plurality of discrete replacement slugs 4 are employed, special mechanisms can be employed to load discrete slugs 4 and to successively extrude the discrete slugs 4 into the hole 6 and down to the bottom of the penetration pipe 40 prior to placement at a succeeding hole 6 site.

The methods of the invention depicted in FIGS. 2 and 3 are especially suitable where soft and penetrable sediments exist to suitable thickness, and when it is desirable not to disperse displaced sediments at the sea floor in significant quantities.

Figure 4:
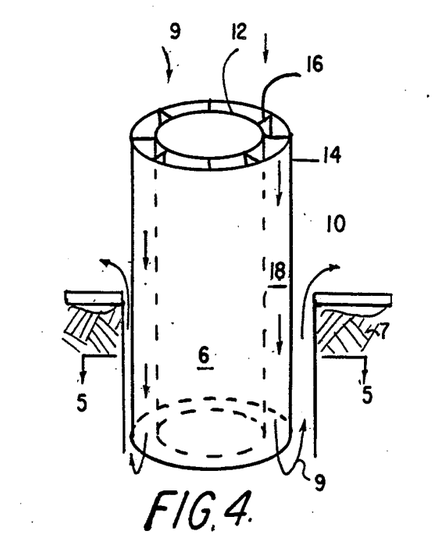
FIG. 4 is a schematic perspective view of a dual concentric drill string used with the disposal method.
Figure 5:
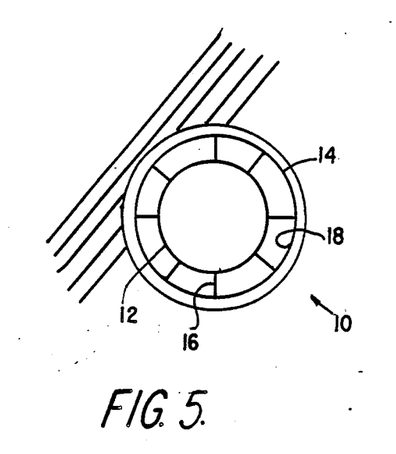
FIG. 5 is a cross-section view taken along the lines 5—5 in FIG. 4.

Another method of the invention employs a dual concentric drill string. More specifically, reference is made to FIGS. 4 and 5 wherein dual concentric drill string 10 includes a central tubular section 12, an outer tubular section 14, and septa 16 supporting the central section 12 within the outer section 14. The septa 16 provide an annular space between the central and outer sections 12 and 14, respectively. The septa 16 also divide the annular space into channels 18. In operation, the slug 4 paste is forced down the central tubular section 12 after a hole 6 is drilled and washed out. To drill the hole 6, drilling fluid, e. g. seawater, represented by arrows 9, is pumped through the channels 18. The drilling bit would excavate near the outer portion of the concentric drill string 10, and jet action of the pumped seawater would wash sediment out of the hole 6 through the annular space between the hole wall and the outer pipe.

In using the concentric drill string 10, the sequence of steps depicted in FIG. 2 would be followed except that the hole 6 is drilled and washed out by the drill string 10 instead of being penetrated and reamed. Employing the concentric drill string 10 is especially desirable for geologic conditions that do not permit gravitational penetrating and reaming by plastic deformation to the desired depth. In general, use of the concentric drill string 10 would permit deeper and fewer holes 6 and deeper burial and work in stiffer sediments. By using the concentric drill string 10, sediment would be dispersed at the sea floor in amounts equivalent to the drilled holes 6 to form a sediment plume near the top of the drilled hole 6.

It is also contemplated that a coring system may be employed using the drill strings in a manner other than described above. More specifically, a core can be taken and reserved in the central tubular sections for filling a hole 6 after the step of injecting a paste slug 4 into the hole 6 by means of a separate feed pipe has taken place. The coring system variation, of course, requires a more complex set of components than the components required for the methods of the invention described above.

Each of the operational modes depicted in FIGS. 1, 2, and 3 are compatible with implementation using a derrick having the capability of installing a length of drill pipe having the desired length into the hole 6 either by washing out the hole 6 or by penetration and reaming. For example, a drill pipe of 400 feet can be used with a derrick having a working capability of 400 feet. Use of a single drill pipe without employing additional pipes that are threaded onto the first drill pipe to gain additional length is referred to as operating with a "single stroke". Single stroke operation is a great time and labor saver. Obviating the need to make and break threaded connections during routine operations saves great amounts of time and labor. However, if single stroke operation were not feasible or otherwise not preferred, as in the case of pilot studies, then the methods of the invention can be used with a plurality of drill pipes threaded together for work not involving the continuous column of sludge.

Preferably, the support for the derrick is a floating support, or the derrick can be supported by the surface of the sediment. A ship, or other floating support, is visualized, having the capacity for initial handling and assembly of the tubular sections; the full "single stroke" does not need to be accommodated by this handling capacity, but could extend into or beneath the hull or platform.

When using a ship for carrying out the disposal methods of the invention, stability of the ship with respect to the hole can be obtained by using commercially available dynamic positioning. The Glomar Challenger was the first deep water, fully automatic dynamically positioned vessel. The methods used in dynamic positioning of the Glomar Challenger, as currently updated and commercially available, can be used in dynamically positioning a ship used for carrying out the invention. More specifically, dynamic positioning utilizes the ships power to hold position in the horizontal plane with respect to some position reference. Computer controlled propellers are present both fore and aft and sideways, and a reference system such as a sonic reference system or a global positioning reference system or inertial reference system can be used for maintaining the desired position. Mooring-assisted dynamic positioning or adjustable mooring systems could also be used, depending on water depth.

Figure 6:
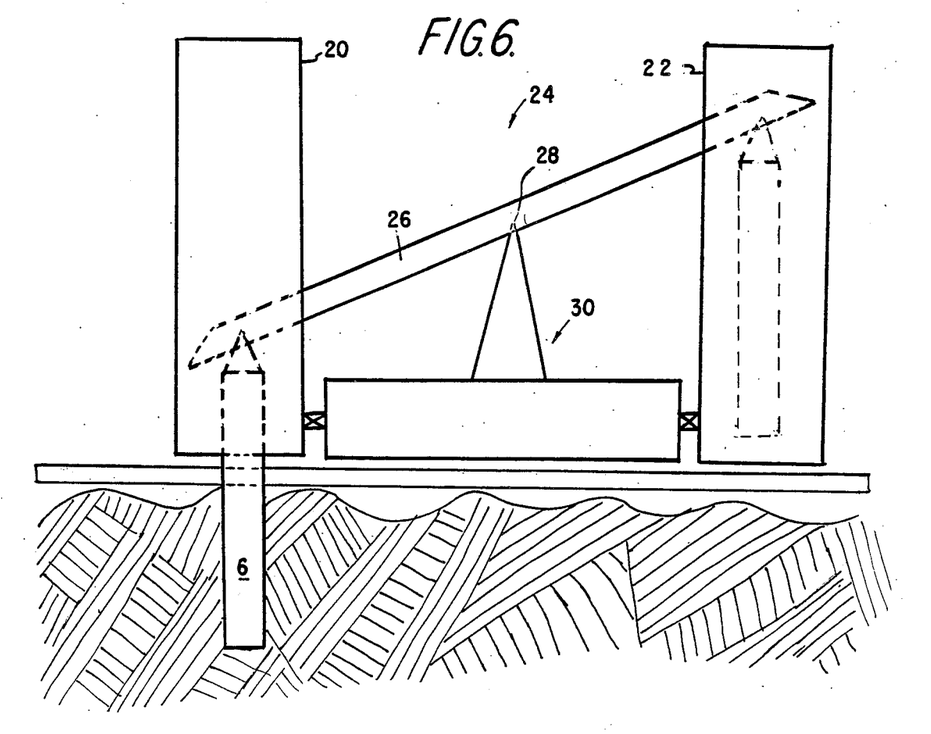
FIG. 6 is a schematic diagram of a tandem drilling system for carrying out the disposal system.

Yet another mode of operation of the method of the invention is contemplated and is depicted schematically in FIG. 6. Two separate drilling subsystems 20 and 22 can be operated in coordination to provide a tandem drilling system 24. Each drilling subsystem 20 and 22 can operate being counterbalanced on a cantilevered beam system 26 employing a centralized bearing 28 and support 30. Each subsystem 20 and 22 operates with opposing synchroneity.

More specifically, each subsystem 20 and 22 of the tandem system 24 can be supported by a large rotating support much like a ferris wheel. The ferris wheel support would be large enough so that on each downstroke, a pipe can be inserted to the desired distance in the geologic formation in a single stroke. By counterbalancing the weights of oppositely synchronized subsystems 20 and 22, the weight of one subsystem helps lift the weight of the other side, and only the load difference between opposing sides needs to be pushed back and forth. To withdraw a drill pipe from the hole 6 after a slug 4 of paste has been deposited in a hole 6, the direction of motion of the counterbalanced beam is simply reversed, and one pipe is removed from the hole 6 in a single stroke.

Most particularly with a fully loaded, continuous-feed system in deep water, weights and masses would be substantial. Only a part of the paste load would be injected for each stroke, the remainder of the loads being carried in readiness for succeeding strokes. By counterbalancing the two subsystems 20 and 22, each will assist the other.

The sequence of operations of a tandem drilling system 24 would generally include an initial setup, drilling one subsystem to full routine depth of penetration, and running the other subsystem to the mud line. For purposes of illustration, a full stroke of penetration of 400 feet will be used, the half stroke being 200 feet. Initial setup would include drilling one subsystem to 400 feet penetration and running or assembling the other subsystem to the mud line. Both subsystems would then be fully loaded with waste paste. During routine operations, the two subsystems, operating separately, must be coordinated. For purposes of illustration the following Table depicts the coordinated operation of the two subsystems 20 and 22 designated as the first and second subsystems. Each numbered step in the Table represents a common time period, and respective numbered entries in the Table represent the particular functions for the common time period associated with the respective subsystems.

TABLE

| First subsystem | Second subsystem |
| --- | --- |
| 1. Simultaneous injection into the hole 6, load from top, and pull to 200 ft. | 1. Drill to 200 ft. |
| 2. Pull 200 ft. to clear mud line. | 2. Drill to 400 ft. |
| 3. Swing to next site. | 3. Remain engaged and prepare for injection. |
| 4. Drill to 200 ft. | 4. Simultaneous injection into the hole, load from top, and pull to 200 ft. |
| 5. Drill to 400 ft. | 5. Pull 200 ft. to clear mud line. |
| 6. Repeat step 1. | 6. Swing to next site. |

As described in the Table, the dual reciprocating tandem system 24 ideally requires a continuous capability to swing one subsystem to the next site, while remaining engaged in the hole 6 with the other subsystem. Depending on water depth and dimensions of the system 24, various patterns can be developed to fill the field at the disposal site with the desired spacing and density of holes. Swinging the dual system to proceed in a continuous manner can be accomplished by yawing the drilling platform within the principles of dynamic positioning and heading control or by use of a turret.

Figure 13:
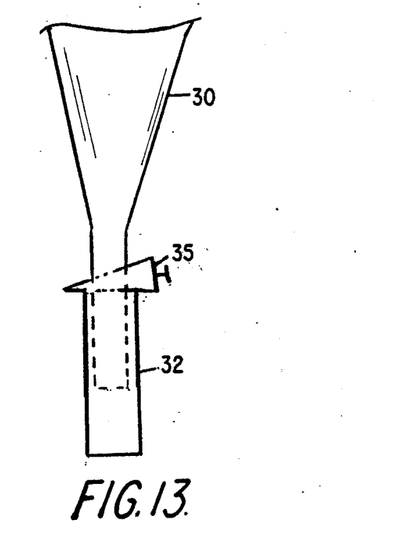
FIG. 13 is a schematic diagram of apparatus for shaping a charge of sludge at a canister as the canister is loaded with the sludge.

Referring to FIG. 13, a funnel-like device 30 is used for shaping a charge of sludge at a canister 32 as the canister is loaded with the sludge. The funnel-like device 30 has a relatively large vertical dimension permitting a hydrostatic head of sludge to exert sufficient pressure for filling the canister 32. The device 30 is raised or the canister 32 is lowered as the canister 32 is being filled. Valve 35 provides control for turning on and off the flow of sludge when appropriate.

Figure 13A:
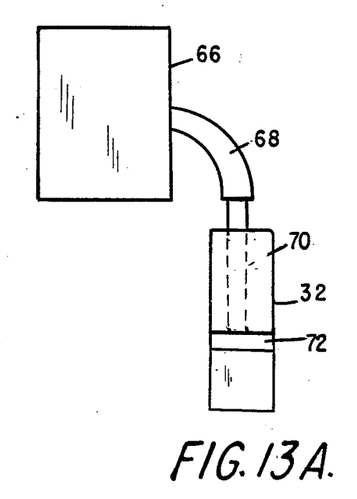
FIG. 13A is a schematic diagram of apparatus for loading a canister with sludge using a piston located in the canister.
Figure 13B:
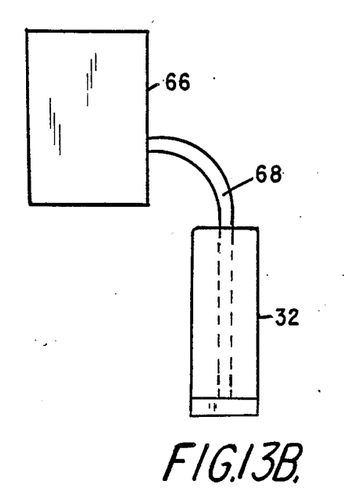
FIG. 13B is a schematic diagram of apparatus for loading a canister directly from a pressurized sludge reservoir.
Figure 14:
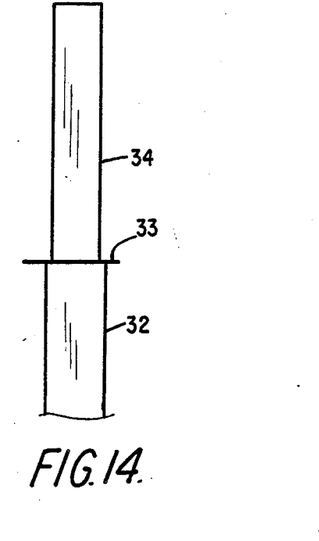
FIG. 14 is a schematic diagram of a step of loading a preshaped slug of sludge into a canister.

Referring to FIG. 14, a preshaped slug 34 can be loaded into a canister 32. Seal 33 is provided and also a central valve; a sufficient vertical dimension is required, within this funnel-like system, to afford the gravitationally induced pressure to cause the mixed paste to plastically deform to inject into and fill the canister 32. Alternatively, a pressurized reservoir can accomplish the same purpose as shown in FIGS. 13A and 13B.

In FIG. 13A, a pressurized reservoir 66 contains sludge which has been compacted and adjusted with respect to its density. A pressure source, such as an air purp (not shown) is available to squeeze the sludge out of the reservoir 66 by plastic deformation. The reservoir 66 is connected by tube 68 to combined piston rod and filling tube 70, and the sludge is pumped into the canister 32 below the level of piston head 72 which moves up in the canister 32 as the slug 4 fills the canister 32.

In FIG. 13B, a pressurized reservoir 66 also contains sludge which has been compacted and adjusted with respect to its density. A pressure source, such as an air pump (not shown) is available to squeeze the sludge out of the reservoir 66 by plastic deformation. A tube 68 is connected to the reservoir 66, and one end of the tube 68 is placed within the canister 32. As the canister 32 is being filled with sludge paste, the canister 32 can be shaken to assure that the canister 32 is completely filled with the paste and has a minimum amount of trapped air. Also, as the canister 32 is being filled, the tube 68 is gradually withdrawn from the canister 32 so that it will be completely filled with paste.

The source of pressure for the pressurized reservoir in FIGS. 13A and 13B could be from a variety of sources. For example, a piston could be located in the reservoir for exerting the pressure for driving the sludge out. Also, a bank of compressed gas tanks could be connected to the pressurized reservoir. When pressure was needed for driving out the sludge, then the compressed gas could be connected to the reservoir.

Figure 15:
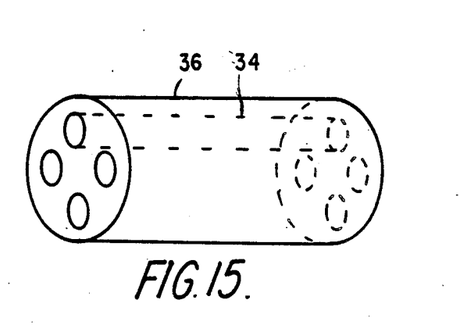
FIG. 15 is a schematic diagram of a turret-like magazine that can hold four, six, or other number of preshaped slugs of sludge being shipped.
Figure 16:
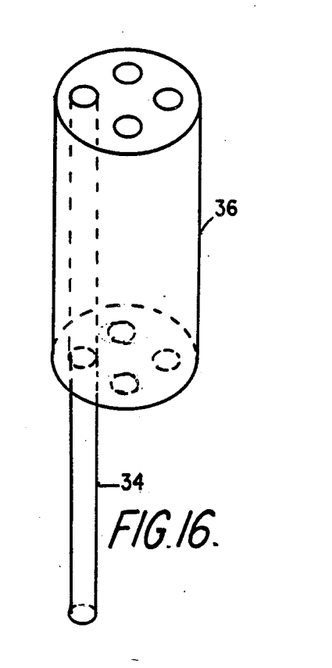
FIG. 16 shows the magazine of FIG. 15 in position for loading a drill pipe.

As depicted in the schematic drawings in FIGS. 15 and 16, a system for carrying preshaped slugs to a drill site may include a turret-like magazine 36 shown to have a capacity for carrying four to six or some other number of preshaped slugs 34 in FIG. 15. More specifically, the magazine 36 in FIG. 15 can be transported to a drill site by a ship at sea. Then the magazine 36, as shown in FIG. 16, is positioned at the top of a drill pipe 34 and a preshaped slug 34 is then loaded therein and forced down into the hole 6. The magazine 36 is rotatable at the top of the hole 6. Once one preshaped slug 34 is unloaded from the magazine 36, the magazine 36 is rotated and indexed to position another preshaped slug 34 at the top of the hole 6.

Figures 7, 7A, 7B:
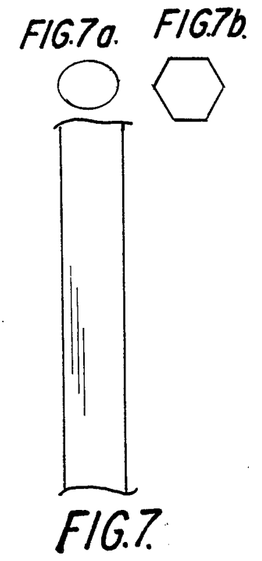
Figures 8, 8A, 8B:
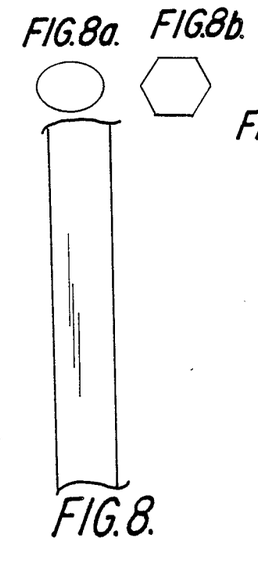
Figures 9, 9A, 9B, 9C, 9D:
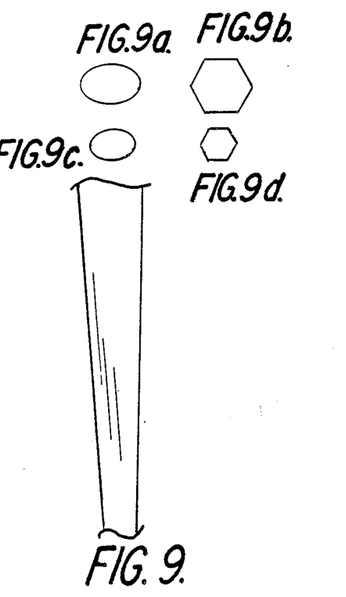
Figures 10, 10A, 10B, 11, 11A, 11B, 11C, 11D:
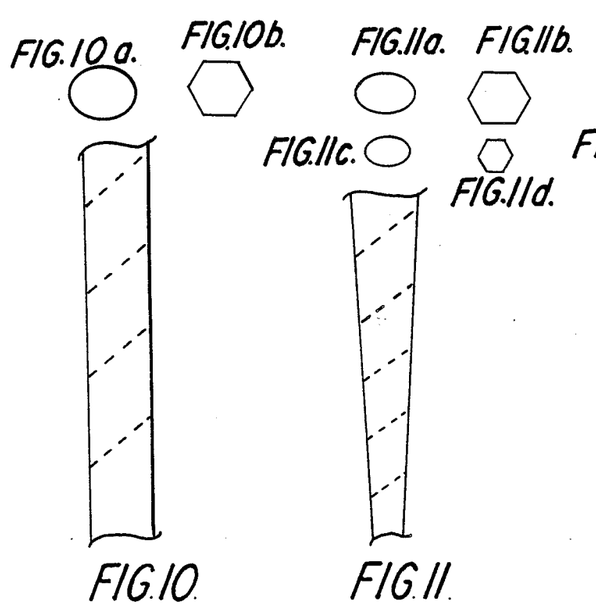
Figures 12, 12A, 12B, 12C, 12D:
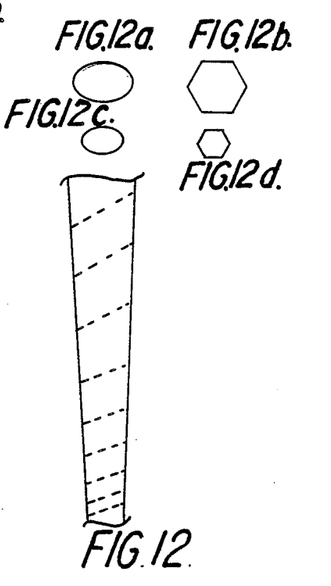

With reference to FIG. 17, drill pipe 40 includes a spring-biased one-way closing configuration 42 located at the bottom end of the pipe 40. The one-way closing configuration 42 is biased in the closed position by one or more springs 41. The examples of one-way valves 42 are shown in solid lines in the closed orientation and are shown in dotted lines 42a in the open orientation. Reamers 44 may also be provided on pipe 40; however, the penetration tool configurations (shown in FIGS. 7-12) accomplish many purposes of the reamers.

The spring biasing may be brought about by heavy leaf springs or pneumatic springs, perhaps loaded by hydrostatic pressure in deep water.

Figure 17A:
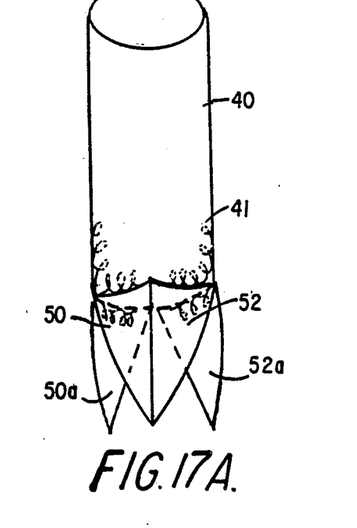
FIG. 17A is another embodiment of a penetrating pipe having a constraining mechanism for preventing the content of the geologic formation from entering the pipe.

FIG. 17A is another embodiment of a penetrating pipe having a constraining mechanism for preventing the content of the geologic formation from entering the pipe. More specifically, two valve members 50 and 52 are shown in the closed position in solid lines and in the open position 50a and 52a, respectively, in broken lines. The valve members 50 and 52 have a rounded shape, and they close together under the influence of the bias springs 41 to form a pointed aspect located along the central axis of the pipe 40.

Figure 17B:
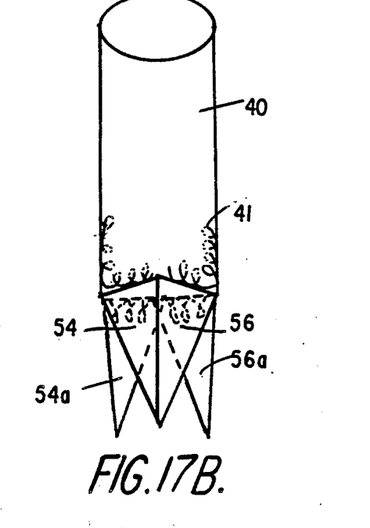
FIG. 17B is yet another embodiment of a penetrating pipe having a constraining mechanism for preventing the content of the geologic formation from entering the pipe.
Figure 17C:
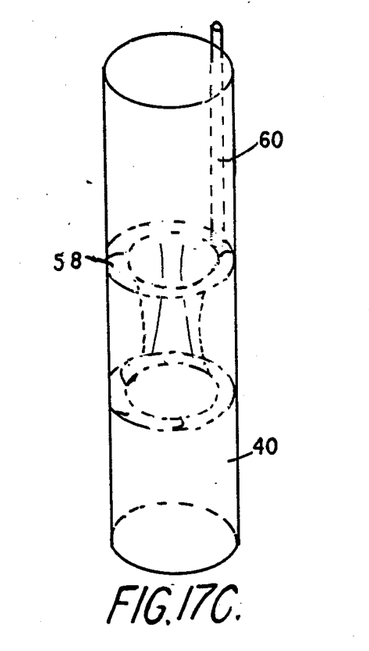
FIG. 17C is another embodiment of a penetrating pipe having a constraining mechanism for preventing the content of the geologic formation from entering the pipe, the embodiment shown in the open position.
Figure 17D:
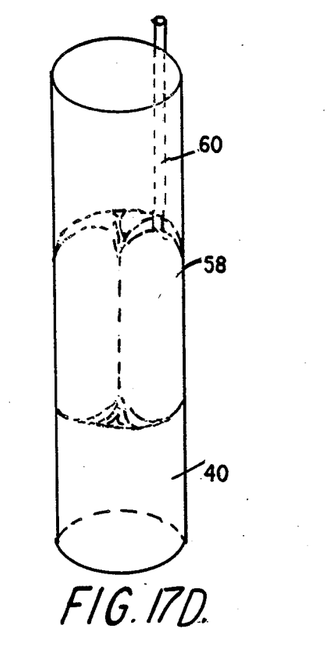
FIG. 17D is the embodiment shown in FIG. 17C in the closed position.

FIG. 17B is another embodiment of a penetrating pipe having a constraining mechanism for preventing the content of the geologic formation from entering the pipe. More specifically, several valve members two of which 54 and 56 are shown in the closed position in solid lines and in the open position 54a and 54a, respectively, in broken lines. The valve members 54 and 56 have a straight shape, and they close together under the influence of the bias springs 41 to form a pointed aspect located along the central axis of the pipe 40.

FIG. 17C is another embodiment of a penetrating pipe having a constraining mechanism for preventing the content of the geologic formation from entering the pipe, the embodiment shown in the open position and includes and inflatable doughnut 58 connected to the surface with an hydraulic line 60.

FIG. 17D shows the embodiment in FIG. 17C when hydraulic pressure has been applied and the doughnut 58 is in the closed position.

Certain general considerations underlie employment of the methods of the invention for disposal of waste solid material in a geologic formation. For example, the consistency of the paste material to be disposed of should be stiff but deformable under pressure to permit shaping. As such, it is expected, with time, to collapse under its own weight and to fill available space in the drilled hole.

There is no intention or expectation that the waste paste will invade or substantially migrate into the surrounding geologic formation. The intention and expectation is that the buried waste material remain confined to the excavated volume in which it is deposited, which volume was specifically excavated for the purpose of receiving the paste or judged suitable for receiving it.

The density of the paste can be adjusted by compaction of relatively low density components. Compaction can be brought about by dewatering, filtering, centrifuging, or a like method of concentrating the solid materials from a liquid/solid mixture. In addition, the density can be adjusted by blending relatively low density components with relatively high density components. For example some relatively high density wastes that can be blended with relatively low density sewage sludge wastes include: metal rich ash from incineration of primarily organic matter; dredge spoils from harbors; other soil materials; and various products from metal mining and refining that would preferably be disposed of by subsurface isolation rather than to be permitted to accumulate in open land heaps. The density of the paste is greater than the surrounding geologic formation in which it is disposed and isolated; with the density of the paste greater than the surrounding formation, lithostatic pressure from the surrounding geologic formation will not be able to buoy up the buried paste from the burial site.

In a typical density profile of a sedimentary geologic formation, a density of no greater than 1.7 is common at depths of several hundred feet. By using the compaction and blending techniques described above, it is easy to provide a compacted paste having a density greater than 1.7.

The use of a paste material is designed to preclude problems that might otherwise occur if a pumpable slurry were used instead. A pumpable slurry might have the undesirable property of invading the surrounding geologic formation and may even buoyantly reach the surface and discharge itself. Also, a pumpable slurry has a solids content that is far below the solids contents of a paste made in accordance with the methods of the invention.

In several respects, consideration of friction should be taken in carrying out the method of the invention. For example, the paste slug should be shaped to a diameter slightly less than the inner diameter of the drill string to reduce friction between the slug and drill string and to allow a fluid film to form in the annular space between the shaped slug and the tubing wall. Enhancement of fluid film formation may be had by forceful injection of water, e. g. seawater, into this annular space. It is also contemplated that forcing a lubricating film through a permeable casing may be employed.

Control of friction between the slug and the tubing wall can be approached from a different perspective, namely, the character of the interior surface of the drill tube. For example, the roughness of the interior surface of the drill tube can be altered. Alternatively, constrictions and controllable, variable constrictions in the tubular profile can be employed as shown in FIGS. 17. Projections into the cross-section of the paste may be employed.

If the friction resulting from friction modifications described above were to rise too high, then additional pressure may be applied to overcome the undesired friction.

Although the examples of application of the disposal method of the invention described thus far relate to disposal of wastes in substantially vertical holes in geologic formations, it is contemplated that injection may be into holes that substantially deviate from the vertical. Generally speaking, use of a non-vertical hole may be desirable when the vertical thickness of the geologic formation is less than desired. For a disposal method employing a non-vertical hole, a sea floor based drilling and hole-loading unit may be employed; if such a unit were mobile and slowly proceeding along the bottom, the use of non-vertical holes trailing behind would reduce pull-out forces.

The disposal methods of the invention may be part of a more comprehensive disposal system. For example, a more comprehensive disposal system may include sewage treatment facilities and locations, land transportation, mixing and preparation of slugs for disposal, sea transportation, characterization and evaluation of sites, and environmental monitoring.

The geologic formations in which the disposal methods of the invention are most applicable are generally unconsolidated oceanic sediments.

The disposal methods of the invention are capable of handling large quantities of sludge in a manner that is very efficient in the use of time and energy. For example, a hole and sludge paste slug having a diameter from 2 to 6 feet is readily obtained by adapting present offshore drilling equipment and techniques. A single stroke drilling operation to provide one such hole to a depth of approximately 400 feet would take only approximately 30 minutes of operating time, with suitable formation characteristics. With an approximately 3 feet diameter hole, a hole depth of 10 feet would be suitable to contain 1 ton of human waste sludge. Assuming an approximately 3 feet diameter hole drilled to a depth of 400 feet, with the bottom 200 feet filled with sludge, each hole could contain approximately 20 tons of sludge.

An especially advantageous benefit of using the disposal method of the invention is the tremendous savings in time for disposal of a much larger quantity of sludge over the prior art methods. More specifically, it would take days to weeks to drill the hole described in the Querio et al patent. The relatively low capacity of the hole alone in Querio et al is partially dependent upon the fact that the aqueous slurry that is pumped downhole contains only 2–3% sewage solids. In sharp contrast, by employing the principles of the invention, it takes only approximately 30 minutes to excavate a hole in the soft undersea sediments that can contain 20 tons of compacted sludge which can be nearly completely sewage or other solids. With the invention, by expending much less drilling time, much more sludge is disposed of than with the Querio et al method of disposal, taking only the volume of the hole and not the volume of the formation into account. It is contemplated that by using a specially designed tandem drilling system described above, it would be possible to make and fill about 96 disposal holes 6 per day. This is equivalent to 1,920 tons of sludge per day or over 600,000 tons in a 320 day year, allowing some time for maintenance and weather. Such a single rig could take care of more than twice the total sludge being dumped in the New York Bight and Boston Harbor together in 1980. One such rig could take care of about 30% of the total sludge generated in the entire coastal-estuarine zone of the United States in 1980, or about 14% as projected to the year 2000.

Even if existing or off the shelf equipment were used to carry out a disposal method of the invention, great benefits in sludge disposal would be achieved.

Aside from efficiency in use of equipment and in use of time needed for sludge disposal, practicing the sludge disposal method of the invention is very efficient in the use of area used for disposal sites. For example, a disposal site area that is 10 nautical miles square (100 square nautical miles), provided with a 50 feet spacing of disposal holes, would provide more than 1.4 million holes which should accommodate operation of a single disposal rig for about 45 years. An actual hole pattern at a site would depend upon the character of the geologic formation, actual diameter of the disposal holes, depth of the holes, and other factors.

The fully controlled insertion of the density adjusted paste into a volume of known dimensions provides a geologically stable situation that will entomb the waste material effectively and in an environmentally sound manner of isolation from active ecosystems. The prior arts of injection of a more dilute slurry that require its passage into the formation and largely uncontrolled migration during and after injection cannot offer this security.

The foregoing description of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A method of disposal of waste solid material in an underwater geologic formation, comprising the steps of:
   forming a hole in the underwater geologic formation and providing temporary support for the hole.
   depositing a slug of waste material in the bottom of the hole thereby burying the slug, the slug having a density greater than the density of the geologic formation adjacent to the hole, and the slug having the consistency of an extrudable paste, and
   removing the support for the hole thereby permitting the geologic formation adjacent to the hole above the buried slug to fill the hole above the slug, thereby sealing the buried slug in the geologic formation.

2. The method described in claim 1 carried out on an underwater geologic formation by an underwater, floor-based drilling and hole loading unit wherein the hole is formed non-vertically in the underwater geologic formation when the underwater, floor-based drilling and hole loading unit proceeds slowly along the underwater floor and non-vertical holes trail behind to reduce pull-out forces.

3. The method described in claim 1 wherein the hole is formed vertically.

4. The method described in claim 1 wherein the hole is formed non-vertically when the vertical thickness of the geologic formation is less than desired.

5. The method described in claim 1, further including the step of inducing the geologic formation adjacent to the hole above the buried slug to fill the hole above the slug, thereby sealing the buried slug in the geologic formation.

6. The method described in claim 1 wherein the geologic formation is a formation covered by water, and wherein the method is carried out using a support that floats on the water.

7. The method described in claim 1 wherein the hole formed in the geologic formation is formed by drilling with a drill bit.

8. The method described in claim 1 wherein the hole formed in the geologic formation is formed by drilling with pumped seawater.

9. The method described in claim 1 wherein the hole formed in the geologic formation is formed by gravitational penetration and reaming with a drill pipe.

10. The method described in claim 1 wherein a plurality of holes are formed by a tandem drilling system including two drilling subsystems having opposing synchroneity.

11. The method described in claim 1 wherein the drilling subsystems having opposing synchroneity share a common base and a counterbalanced cantilevered beam.

12. The method described in claim 1 wherein the hole is formed by employing a dual concentric drill string which includes a central tubular section, an outer tubular section, septa supporting the central section within the outer section and providing an annular space between the central and outer sections, said septa dividing the annular space into channels through which seawater can be passed to wash out drilled material from the central section.

13. The method described in claim 1 wherein the hole formed in the geologic formation is formed by a rotatable drill pipe and a gravitationally and rotationally driven penetrating and reaming tool having an outer cross-section that is circular or regular polygonal.

14. The method described in claim 1 wherein the hole formed in the geologic formation is formed by a rotatable drill pipe and a gravitationally and rotationally driven penetrating and reaming tool having an outer cross-section that is oval or compressed polygonal.

15. The method described in claim 1 wherein the hole formed in the geologic formation is formed by a rotatable drill pipe and a gravitationally and rotationally driven penetrating and reaming tool having an outer cross-section that is tapered oval with larger diameter at top and small diameter at bottom.

16. The method described in claim 1 wherein the hole formed in the geologic formation is formed by a rotatable drill pipe and a gravitationally and rotationally driven penetrating and reaming tool having an outer cross-section that is twisted oval.

17. The method described in claim 1 wherein the hole formed in the geologic formation is formed by a rotatable drill pipe and a gravitationally and rotationally driven penetrating and reaming tool having an outer cross-section that is oval, tapered, and twisted with constant pitch.

18. The method described in claim 1 wherein the hole formed in the geologic formation is formed by a rotatable drill pipe. and a gravitationally and rotationally driven penetrating and reaming tool having an outer cross-section that is oval, tapered, and twisted with variable pitch.

19. The method described in claim 1 wherein the hole formed in the geologic formation is formed by a rotatable drill pipe and a gravitationally and rotationally driven penetrating and reaming tool having an outer cross-section that is somewhat oval, thinning downward, and twisted with varying (increasing or decreasing) pitch downward that allows penetration of the pipe crossing its own thread to convert torsion to forcing the hole more open.

20. The method described in claim 1 wherein, without limitation in depth, the holes typically formed in the geologic formation would be from two hundred to six hundred feet deep.

21. The method described in claim 1 wherein, without limitation in diameter, the holes typically formed in the geologic formation would be from two to six feet in diameter.

22. The method described in claim 1 wherein the hole is formed in a single stroke operation.

23. The method described in claim 1 wherein the slug is in the form of a preshaped slug in a container for transport to the hole prior to depositing in the hole.

24. The method described in claim 1 wherein a plurality of slugs are carried by a magazine for transport to the hole.

25. The method described in claim 24 wherein the plurality of slugs are in containers carried by the magazine.

26. The method described in claim 1 wherein the magazine is rotatable adjacent to the top of the drill or conductor pipe.

27. The method described in claim 1 wherein the magazine is transported by a ship to the hole.

28. The method described in claim 1 wherein a plurality of preshaped slugs are carried by a magazine for transport to the hole.

29. The method described in claim 1, wherein:
the hole formed in the geologic formation is between two and six hundred feet deep and from two to six feet in diameter, and
the hole is formed in a single stroke operation.

30. A method of disposal of waste solid material in a geologic formation, comprising the steps of:
forming a hole in the geologic formation employing a drill pipe having an end placed at the bottom of the hole,
depositing a slug of waste material into the bottom of the hole through the drill pipe, the slug having a density greater than the density of the geologic formation adjacent to the hole,
withdrawing the drill pipe and simultaneously extruding the slug from the drill pipe into the hole thereby burying the slug,
permitting the geologic formation adjacent to the hole above the buried slug to fill the hole above the slug, thereby sealing the buried slug in the hole in the geologic formation.

31. A method of disposal of waste solid material in a geologic formation, comprising the steps of:
loading a pipe with an initial slug of waste material, the slug having a density greater than the density of the geologic formation adjacent to the hole,
penetrating the loaded pipe into the geologic formation to form an initial hole without displacing the initial slug from the pipe,
locating the end of the pipe at the bottom of the hole,
inserting a replacement slug of material at the top of the pipe,
simultaneously extruding the initial slug out the bottom of the pipe into the hole, and proportionately withdrawing the pipe up from the bottom of the hole and out of the geologic formation whereby the replacement slug is moved to the bottom of the pipe, thereby depositing the initial slug in the hole and positioning the replacement slug in the pipe for insertion into a subsequently penetrated hole,
permitting the geologic formation adjacent to the initial hole above the deposited slug to fill the initial hole above the slug, thereby sealing the deposited slug in the hole in the geologic formation.

32. A method of disposal of waste solid material in a geologic formation, comprising the steps of:
loading a pipe with an initial slug of waste material, the slug having a density greater than the density of the geologic formation adjacent to the hole,
loading the pipe with a charge of seawater on top of the slug,
penetrating the loaded pipe into the geologic formation to form an initial hole without displacing the initial slug from the pipe,
locating the end of the pipe at the bottom of the hole,
inserting a replacement slug of material at the top of the pipe on top of the charge of seawater,
simultaneously extruding the initial slug out the bottom of the pipe into the hole and proportionately withdrawing the pipe up from the bottom of the hole and out of the geologic formation, whereby the initial slug is deposited in the hole,
simultaneously discharging the charge of seawater out the bottom of the pipe, and moving the replacement slug to the bottom of the pipe thereby positioning the replacement slug in the pipe for insertion into a subsequently penetrated hole.

33. A method of disposal of waste solid material in a geologic formation, comprising the steps of:
a. loading a pipe with an earlier slug in a series of slugs of waste material, the slug having a density greater than the density of the geologic formation adjacent to the hole,
b. loading the pipe with a charge of seawater on top of the slug,
c. penetrating the loaded pipe into the geologic formation to form a hole without displacing the slug from the pipe,
d. locating the end of the pipe at a selected location in the hole, e. inserting a later slug in the series of slugs of material at the top of the pipe on top of the charge of seawater,
f. simultaneously extruding the earlier loaded slug out the bottom of the pipe into the hole and proportionately withdrawing the pipe up from the hole and out of the geologic formation, whereby the earlier loaded slug is deposited in the hole, and
g. simultaneously discharging the charge of seawater out the bottom of the pipe, and moving the later loaded slug to the bottom of the pipe thereby positioning the later loaded slug in the pipe for subsequent insertion at a selected location in the hole.

34. The disposal method described in claim 33 wherein steps a. through g. are repeated.

* * * * *